US010009934B2

(12) United States Patent
Liu et al.

(10) Patent No.: US 10,009,934 B2
(45) Date of Patent: *Jun. 26, 2018

(54) METHOD FOR DATA COMMUNICATION, SYSTEM FOR COMMUNICATION AND RELATED DEVICES

(71) Applicant: Huawei Technologies Co., Ltd., Shenzhen (CN)

(72) Inventors: Lan Liu, Shenzhen (CN); Wanqiang Zhang, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 9 days.

This patent is subject to a terminal disclaimer.

(21) Appl. No.: 15/147,523

(22) Filed: May 5, 2016

(65) Prior Publication Data

US 2017/0006646 A1 Jan. 5, 2017

Related U.S. Application Data

(63) Continuation of application No. 14/721,279, filed on May 26, 2015, now Pat. No. 9,369,860, which is a (Continued)

(30) Foreign Application Priority Data

Jun. 13, 2008 (CN) .......................... 2008 1 0038984

(51) Int. Cl.
*H04M 1/00* (2006.01)
*H04W 76/02* (2009.01)
(Continued)

(52) U.S. Cl.
CPC ........... *H04W 76/021* (2013.01); *H04W 8/08* (2013.01); *H04W 8/18* (2013.01); *H04W 8/24* (2013.01);
(Continued)

(58) Field of Classification Search
CPC ............................. H04W 88/06; H04W 48/18
(Continued)

(56) References Cited

U.S. PATENT DOCUMENTS 7,343,153 B1 3/2008 Kauhanen et al.
7,505,783 B2 3/2009 Park et al.
(Continued)

FOREIGN PATENT DOCUMENTS

CN 1276120 A 12/2000
CN 1627756 A 6/2005
(Continued)

OTHER PUBLICATIONS

"3rd Generation Partnership Project; Technical Specification Group Core Network; Mobile radio interface signalling layer 3; General aspects (Release 7)," 3GPP TS 24.007 V7.0.0, Sep. 2005, 142 pages.
(Continued)

*Primary Examiner* — Charles Shedrick
(74) *Attorney, Agent, or Firm* — Slater Matsil, LLP

(57) ABSTRACT

A data communication method, a communication system, and related devices are configured to establish a transaction identifier (TI) in a user equipment (UE). The data communication method includes the following steps. A mobility management entity (MME) receives a request message and obtains ability information of the UE. If the UE has an ability to access a Universal Terrestrial Radio Access Network/GSM/EDGE Radio Access Network (UTRAN/GERAN), the MME generates the TI. A communication system and related devices are also provided. Thus, the TI is effectively established in the UE, so as to ensure normal processing of the UE.

19 Claims, 12 Drawing Sheets

Related U.S. Application Data continuation of application No. 14/455,096, filed on Aug. 8, 2014, now Pat. No. 9,060,358, which is a continuation of application No. 13/869,699, filed on Apr. 24, 2013, now Pat. No. 8,838,168, which is a continuation of application No. 12/966,620, filed on Dec. 13, 2010, now Pat. No. 8,452,327, which is a continuation of application No. PCT/CN2009/072245, filed on Jun. 12, 2009.

(51) Int. Cl.
   *H04W 8/18* (2009.01)
   *H04W 8/24* (2009.01)
   *H04W 72/04* (2009.01)
   *H04W 92/02* (2009.01)
   *H04W 8/08* (2009.01)
   *H04W 76/11* (2018.01)
   *H04W 48/18* (2009.01)
   *H04W 88/16* (2009.01)

(52) U.S. Cl.
   CPC ........ *H04W 72/0406* (2013.01); *H04W 76/11* (2018.02); *H04W 92/02* (2013.01); *H04W 48/18* (2013.01); *H04W 88/16* (2013.01)

(58) Field of Classification Search
   USPC ............. 455/466, 445, 552.1; 370/389, 331; 380/247; 709/203
   See application file for complete search history.

(56) References Cited

U.S. PATENT DOCUMENTS

| | | |
|---|---|---|
| 2006/0019698 A1 | 1/2006 | Ahya et al. |
| 2006/0129638 A1 | 6/2006 | Deakin |
| 2006/0182280 A1 | 8/2006 | Laitinen et al. |
| 2006/0264217 A1 | 11/2006 | Shaheen |
| 2007/0019643 A1 | 1/2007 | Shaheen |
| 2007/0032251 A1 | 2/2007 | Shaheen |
| 2007/0174443 A1 | 7/2007 | Shaheen et al. |
| 2007/0204050 A1 | 8/2007 | Liu et al. |
| 2007/0258427 A1 | 11/2007 | Shaheen et al. |
| 2008/0013553 A1 | 1/2008 | Shaheen |
| 2008/0160959 A1 | 7/2008 | Huang et al. |
| 2008/0181178 A1 | 7/2008 | Shaheen |
| 2009/0016344 A1 | 1/2009 | Hu et al. |
| 2009/0196213 A1 | 8/2009 | Zhong et al. |
| 2009/0262706 A1 | 10/2009 | Zhu et al. |
| 2011/0051691 A1 | 3/2011 | Hietalahti et al. |

FOREIGN PATENT DOCUMENTS

| | | |
|---|---|---|
| CN | 1867185 A | 11/2006 |
| CN | 1941993 A | 4/2007 |
| CN | 1980453 A | 6/2007 |
| CN | 1997206 A | 7/2007 |
| CN | 101047950 A | 10/2007 |
| CN | 101188537 A | 5/2008 |
| CN | 101340429 A | 1/2009 |
| CN | 101365159 A | 2/2009 |
| CN | 101472350 A | 7/2009 |
| CN | 101572861 A | 11/2009 |
| CN | 102869120 A | 1/2013 |
| EP | 1006746 A2 | 6/2000 |
| EP | 1182558 A1 | 2/2002 |
| EP | 2007161 A1 | 12/2008 |
| WO | 2005027417 A1 | 3/2005 |
| WO | 2007144757 A2 | 12/2007 |
| WO | 2008046348 A1 | 4/2008 |

OTHER PUBLICATIONS

"3rd Generation Partnership Project; Technical Specification Group Services and System Aspects; General Packet Radio Service (GPRS); Service description; Stage 2 (Release 8)," 3GPP TS 23.060 V8.1.0, Jun. 2008, pp. 1-10, 16, 42, 76-77, 143-144, 156, and 168-169.

"3rd Generation Partnership Project; Technical Specification Group Services and System Aspects; General Packet Radio Service (GPRS); Service description; Stage 2 (Release 8)," 3GPP TS 23.060 V8.10, Jun. 2008, 259 Pages.

"3rd Generation Partnership Project; Technical Specification Group Services and System Aspects; General Packet Radio Service (GPRS) enhancements for Evolved Universal Terrestrial Radio Access Network (E-UTRAN) access (Release 8)," 3GPP TS 23.401 V8.2.0, Jun. 2008, 182 Pages.

"3rd Generation Partnership Project; Technical Specification Group Core Network and Terminals; Mobile radio interface Layer 3 specification; Core network protocols; Stage 3 (Release 8)," 3GPP TS 24.008 V8.2.0, Jun. 2008, 553 Pages.

"3rd Generation Partnership Project; Technical Specification Group Core Network and Terminals; Non-Access-Stratum (NAS) protocol for Evolved Packet System (EPS); Stage 3 (Release 8)," 3GPP TS 24.301 V0.3.0, May 2008, 113 Pages.

"3rd Generation Partnership Project; Technical Specification Group Radio Access Network; User Equipment (UE) conformance specification; Part 1: Protocol conformance specification (Release 8)," 3GPP TS 34.123-1 V8.2.0, Mar. 2008, 5508 Pages.

Huawei, "Discussion of SAE Bearer Identifier," 3GPP TSG CT WG1 Meeting #47, C1-071071, Discussion and Approval, Beijing, China, May 7-11, 2007, 3 pages.

Nokia, "Message contents for the RANAP procedures," TSG RAN WG3 Meeting #4, TSGR3#4(99)503, Warwick, UK, Jun. 1-4, 1999, 14 pages.

METHOD FOR DATA COMMUNICATION, SYSTEM FOR COMMUNICATION AND RELATED DEVICES

This application is a continuation of U.S. application Ser. No. 14/721,279, filed on May 26, 2015, which is a continuation of U.S. application Ser. No. 14/455,096, filed on Aug. 8, 2014, now U.S. Pat. No. 9,060,358, which is a continuation of U.S. application Ser. No. 13/869,699, filed on Apr. 24, 2013, now U.S. Pat. No. 8,838,168, which is a continuation of U.S. application Ser. No. 12/966,620, filed on Dec. 13, 2010, now U.S. Pat. No. 8,452,327, which is a continuation of International Application No. PCT/CN2009/072245, filed on Jun. 12, 2009. The International application claims priority to Chinese Patent Application No. 200810038984.7, filed on Jun. 13, 2008. The aforementioned patent applications are hereby incorporated by reference in their entireties.

TECHNICAL FIELD

The present invention relates to the field of communication technology, and more particularly to a data communication method, a communication system, and related devices.

BACKGROUND

In a Universal Mobile Telecommunication System (UMTS), the process for establishing a Packet Data Protocol (PDP) context by a user equipment (UE) is as shown in FIG. 1.

Firstly, the UE sends an Activate PDP Context Request message containing parameters such as a Network Layer Service Access Point Identifier (NSAPI) and a Transaction Identifier (TI) to a Serving General Packet Radio Service Support Node (SGSN). The NSAPI is an identifier assigned by the UE to identify an established PDP context, and is used between the SGSN and a Gateway General Packet Radio Service Support Node (GGSN). The TI is a transaction identifier assigned by the UE to identify the established PDP context and is used between the UE and the SGSN. After the PDP context is established, the TI is recorded by the UE and the SGSN; during subsequent operations (for example, modification and deactivation) on the PDP context, for example, in a Modify PDP Context or Deactivate PDP Context Request message, the PDP context is associated with the TI instead of the NSAPI.

In a Long Term Evolved (LTE) network system, an Evolved Packet System (EPS) Bearer ID is corresponding to the NSAPI, but the identifier is assigned by a Mobility Management Entity (MME) instead of the UE, and in an NAS message between the UE and the MME, the bearer is identified by the EPS Bearer ID, and identifier information similar to the TI does not exist.

In addition, in an R8 network, the concept of default bearer is introduced, that is, when the UE accesses a System Architecture Evolved (SAE) network through an Evolved Universal Terrestrial Radio Access Network (EUTRAN), the UE firstly establishes the default bearer, and the default bearer cannot be deleted, if the default bearer is deleted, a dedicated bearer corresponding to the default bearer will be deleted as well; when the UE accesses the SAE through a GSM/EDGE Radio Access Network/Universal Terrestril Radio Access Network (GERAN/UTRAN), the concept similar to the default bearer is also adopted, and the UE having EUTRAN ability activates an interactive or background PDP context after being attached to the GERAN/UTRAN.

In the prior art, the UE establishes the bearer context in the EUTRAN, and the UE and the MME identify the bearer by the EPS bearer ID. After the UE moves to 2G/3G, in the subsequent operations on the PDP context, for example, updating the PDP context, for the NAS message between the UE and the SGSN, the PDP context will be identified by the TI, but TI information does not exist in the UE and the SGSN at this time, so that the process cannot normally works.

SUMMARY

The embodiments of the present invention are directed to a data communication method, a communication system, and related devices, which can establish a TI in a UE when a bearer established in an LTE is mapped to a PDP context of a GERAN/UTRAN.

In an embodiment of the present invention provides a data communication method, which includes the following contents. An MME receives a request message, and obtains ability information of a UE. If the UE has an ability to access a UTRAN/GERAN, the MME generates a TI.

In another embodiment of the present invention provides a data communication method, which includes the following contents. A default bearer creating request message sent by an SGSN is received. If the default bearer creating request message includes attribute instruction information, a default bearer is established according to a Quality of Service (QoS) parameter in the default bearer creating request message.

In another embodiment of the present invention provides a communication system, which includes a packet data network gateway (PGW) and an MME. The PGW is configured to receive a request message resource allocation request message sent by the MME, determine whether to initiate bearer modification or establish a new bearer according to the request message resource allocation request message, and send a dedicated bearer creating request message to the MME if determining to establish the new bearer. The MME is configured to receive the request message resource allocation request message sent by a UE, forward the request message resource allocation request message to the PGW, receive the dedicated bearer creating request message sent by the PGW, obtain a bearer identifier according to the dedicated bearer creating request message, obtain ability information of the UE, determine whether the UE has an ability to access a UTRAN or GERAN according to the ability information of the UE, generate a TI according to the bearer identifier and according to a preset generation rule if the UE has the ability, and send the TI to the UE.

In another embodiment of the present invention provides an MME, which includes an obtaining unit configured to obtain ability information of a UE, a receiving unit configured to receive a request message, and a generating unit configured to generate a TI if the UE has an ability to access a UTRAN or GERAN.

In another embodiment of the present invention provides a UE, which includes an identifier receiving unit configured to receive a bearer identifier delivered by a core network element, and a UE side TI generating unit configured to generate a TI according to the bearer identifier and according to a preset generation rule.

The technical solutions have the following beneficial effects:

In the embodiments of the present invention, after it is determined that the UE has the ability to access the UTRAN or GERAN according to the obtained ability information of the UE, the TI is generated according to the pre-assigned bearer identifier and according to the preset generation rule, and the UE is notified of the TI; alternatively, the UE is notified of the bearer identifier, and the UE directly generates the TI according to the bearer identifier, so that the TI is established in the UE.

DETAILED DESCRIPTION OF ILLUSTRATIVE EMBODIMENTS

The embodiments of the present invention provides a data communication method, a communication system, and related devices, which can establish a TI in a UE and an SGSN when a bearer established in an LTE is mapped to a PDP context of a GERAN/UTRAN.

In the embodiments of the present invention, after it is determined that the UE has an ability to access a UTRAN or GERAN according to the obtained ability information of the UE, the TI is generated according to a pre-assigned bearer identifier and according to a preset generation rule, and the UE is notified of the TI; alternatively, the UE is notified of the bearer identifier, and the UE directly generates the TI according to the bearer identifier, so that the TI is established in the UE.

The embodiments of the present invention may be categorized as follows based on the modes for generating the TI.

A. TI Generated by an MME

In this embodiment, if a UE has the ability to access a UTRAN or GERAN (3G/2G), when the UE establishes a bearer through an EUTRAN access network, the MME assigns each TI for each bearer context of the UE, and notifies the UE of the TI through a NAS message. The UE records the TI information, so as to use the TI information when accessing the 2G/3G, and the MME also needs to transfer the context to the SGSN when performing handover to the 2G/3G or during a routing area updating process (RAU). Alternatively, the MME sends the value of the TI to the UE by carrying the value of the TI in a Session Management Configuration IE, or sends the value of the TI to the UE as an independent IE. A first embodiment, a second embodiment, a third embodiment and a fourth embodiment are TI establishing processes under four scenarios.

A1. Attaching Process

Figure 1:
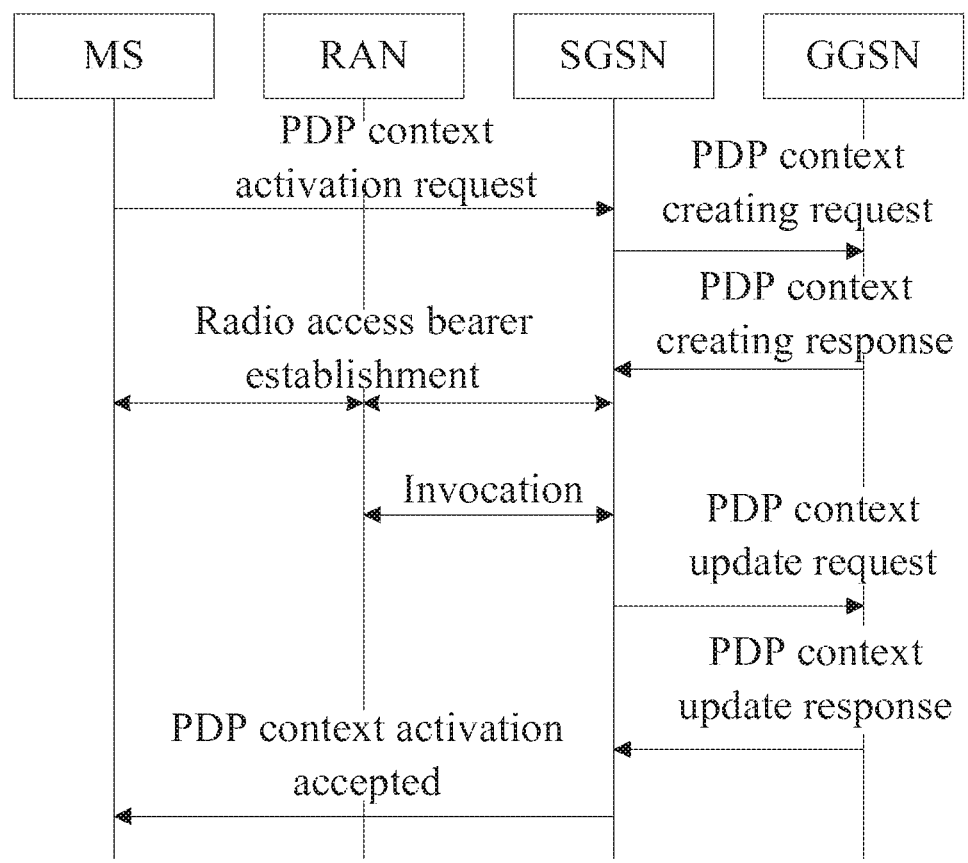
FIG. 1 is a flow chart of establishing a PDP context by a UE in the prior art.
Figure 2:
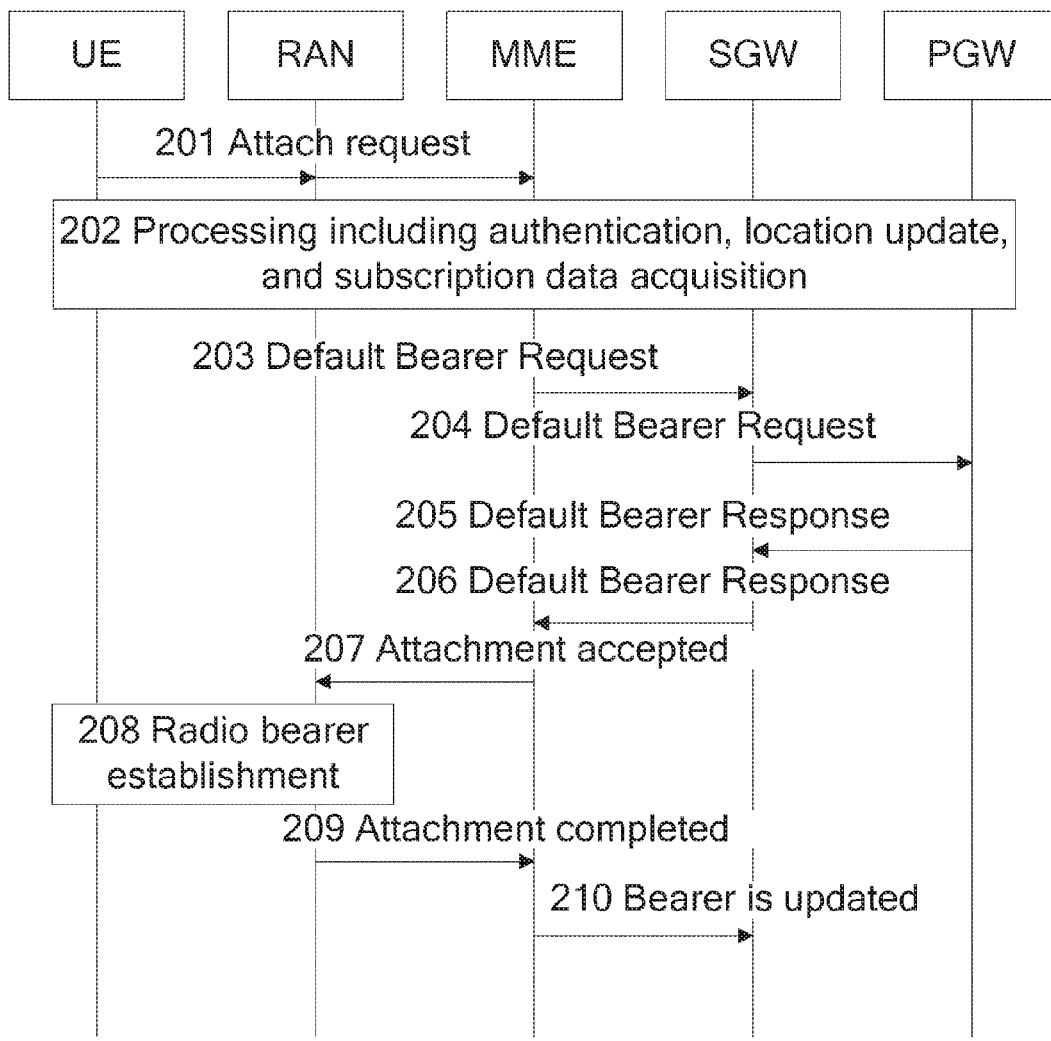
FIG. 2 is a flow chart of a first embodiment of a data communication method according to the present invention.

In a first embodiment, as shown in FIG. 2, an attaching process of a UE in an EUTRAN is described.

In step 201, the UE sends an Attach Request message to an MME.

The Attach Request message sent by the UE carries ability information of the UE, in which the ability information is configured to identify whether the UE has an ability to access a UTRAN or GERAN.

In step 202, after receiving the Attach Request, the MME triggers a series of processing, for example, authentication, location updating, and subscription data acquisition.

In step 203, the MME creates a Default Bearer Request, and initiates a default bearer establishing procedure to a PGW after selecting a Packet Data Network Gateway (PGW) and a serving gateway (SGW).

In step 204, the SGW forwards the Default Bearer Request created by the MME to the PGW.

In step 205, after receiving the Default Bearer Request, the PGW creates a Default Bearer Response.

In step 206, the SGW forwards the Default Bearer Response created by the PGW to the MME.

Steps 203 to step 206 may be summarized as follows: After selecting the PGW and the SGW, the MME initiates the default bearer establishing procedure to the PGW, and the PGW responds and creates a default bearer response message and sends it to the MME.

In step 207, the attachment is accepted.

After receiving the response message, the MME sends an Attach Accept message to the UE.

The Attach Request message received by the MME carries the ability information of the UE, so the MME may determine whether the UE has the ability to access the UTRAN or GERAN. If the MME finds out that the UE has the ability to access the UTRAN or GERAN, the MME assigns a value of a TI to each bearer established by the UE, and the information is sent to the UE as an independent IE or as a part of a Session Management Configuration IE. The UE receives and stores the value of the TI, and uses the value of the TI when accessing the UTRAN and the GERAN.

It should be noted that, before determining the ability information of the UE, the MME may obtain a bearer identifier according to the received attaching request message. As the UE initiates the attaching process, in this step, the bearer identifier may be assigned by MME, and the assigned bearer identifier is obtained.

The MME generates the TI according to the obtained bearer identifier and a preset generation rule. Here, the specific generation rule is not limited, but each TI needs to be corresponding to each bearer identifier.

It should be noted that the generation rule in this embodiment and subsequent embodiments is configured to describe the process for generating the TI according to the bearer identifier, and the generation rule is a corresponding relation between the bearer identifier and the TI. The generation rule is a preset rule, and is not limited in this embodiment and the subsequent embodiments.

In step 208, a radio bearer is established.

In step 209, the attachment is completed.

In step 210, the bearer is updated. Steps 208 to 210 may be summarized as follows:

The radio bearer is established between an RAN node and the UE, the UE sends an attach complete message to the MME, and the MME updates the bearer between the MME and the SGW.

In this embodiment, during the attaching procedure of the UE, the MME may assign the TI for the UE, so that the UE can obtain the TI. Thus, after moving to the GERAN/UTRAN, the UE can still perform normal processing.

A2. Dedicated Bearer Establishing Process Initiated by a PGW

Figure 3:
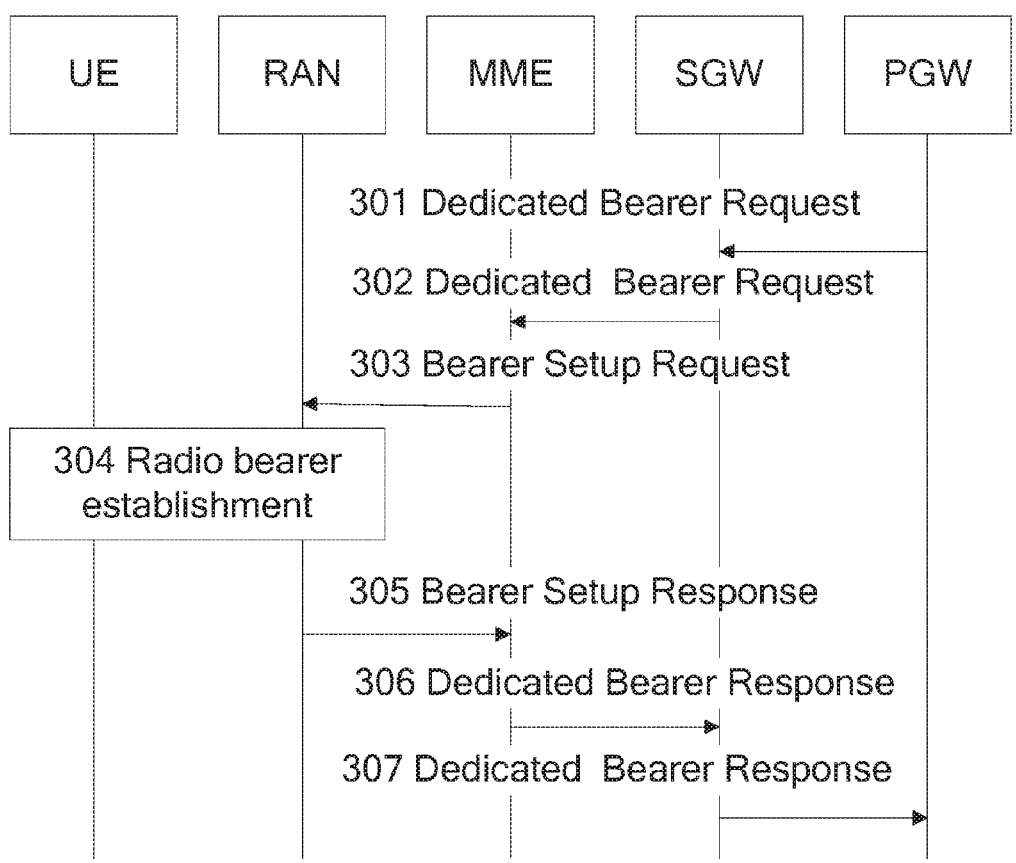
FIG. 3 is a flow chart of a second embodiment of a data communication method according to the present invention.

In a second embodiment, as shown in FIG. 3, the dedicated bearer establishing process initiated by the PGW is described.

In step 301, the PGW creates a Dedicated Bearer Request, and sends the dedicated bearer request to an SGW.

When the network needs to initiate establishing a dedicated bearer to the UE for data transmission, the PGW sends a dedicated bearer establishing request message, in which the dedicated bearer establishing request message carries an identifier of the UE that needs to create the dedicated bearer.

In step 302, the SGW forwards the Dedicated Bearer Request created by the PGW to an MME.

Steps 301 and 302 may be summarized as follows: The PGW initiates dedicated bearer establishment to the MME.

In step 303, after receiving the created Dedicated Bearer Request message, the MME sends a Bearer Setup Request to an RAN node.

After receiving the Dedicated Bearer Establishing Request message, the MME extracts the related identifier of the corresponding UE from the Dedicated Bearer Establishing request message, and obtains ability information in mobility management information of the corresponding UE according to the identifier. The MME determines whether the UE has an ability to access a UTRAN or GERAN according to the ability information of the UE; if the MME finds out that the UE has the ability to access the UTRAN or GERAN, the MME assigns a value of a TI to each bearer established by the UE in the Bearer Setup Request message, in which the TI information may be carried as an independent IE or a part of a Session Management Configuration IE.

It should be noted that, before determining the ability information of the UE, the MME may firstly assign a bearer identifier according to the Dedicated Bearer Establishing request message sent by the PGW, and may also obtain the bearer identifier related to the UE. When the UE has the ability to access the UTRAN or GERAN, the MME generates the TI according to all the determined bearer identifiers and a preset generation rule. Here, the specific generation rule is not limited, but each TI needs to be corresponding to each bearer identifier.

In step 304, a radio bearer is established. In this step, the RAN node transparently transmits the TI information to the UE through the establishment of the radio bearer. The UE receives and stores the value of the TI, and uses the value of the TI when accessing the UTRAN and the GERAN.

In step 305, the RAN creates a Bearer Setup Response.

In step 306, the MME creates a Dedicated Bearer Response.

In step 307, the SGW forwards the Dedicated Bearer Response created by the MME.

Steps 305 to 307 may be summarized as follows: The RAN node returns the Bearer Setup Response to the MME, and the MME creates a Dedicated Bearer Response message to the PGW.

In this embodiment, during the dedicated bearer establishing process, the MME may assign the TI to the UE, enabling the UE to obtain the TI, so that the UE can still perform normal processing after moving to the GERAN/UTRAN.

A3. Resource Requesting Process Initiated by a UE

Figure 4:
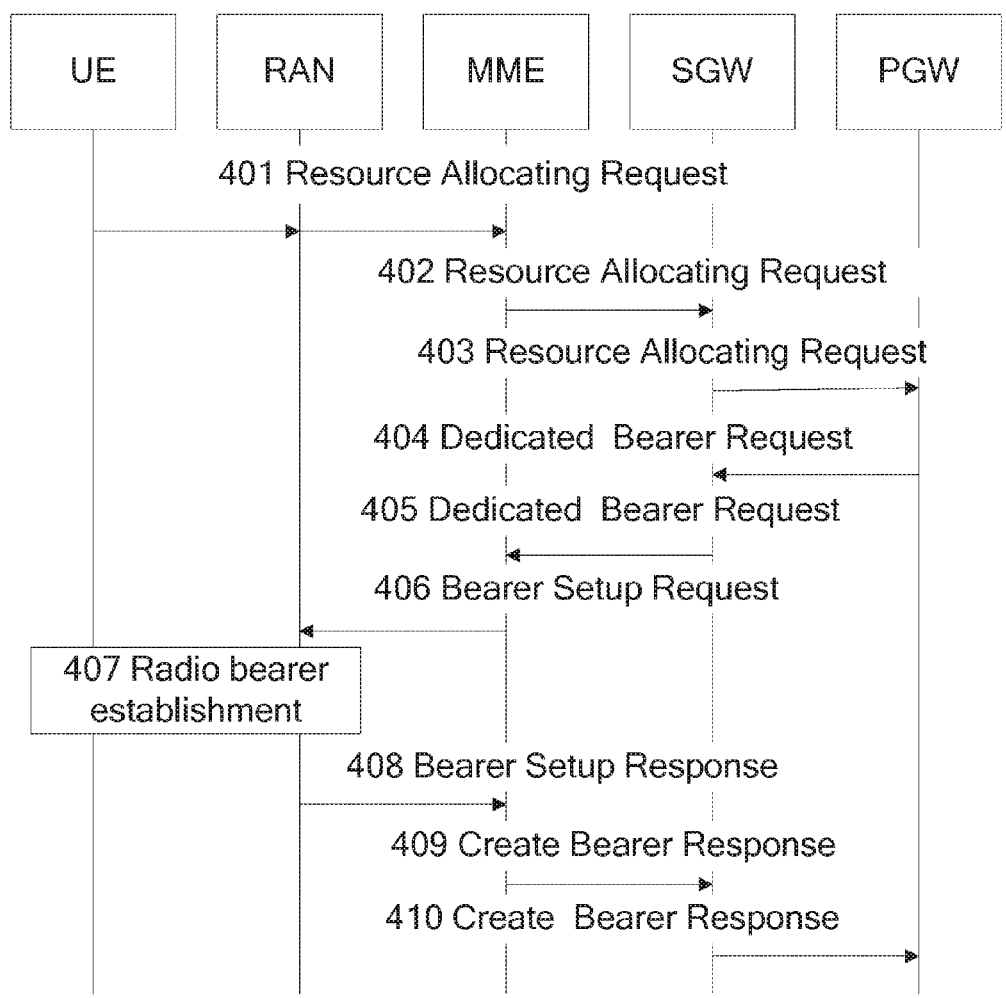
FIG. 4 is a flow chart of a third embodiment of a data communication method according to the present invention.

In a third embodiment, as shown in FIG. 4, the resource requesting process initiated by the UE is described.

In step 401, the UE sends a Resource Allocating Request to an RAN, and the RAN forwards the resource allocating request message sent by the UE to an MME.

In step 402, the MME forwards the Resource Allocating Request message sent by the UE to the SGW.

In step 403, the SGW forwards the Resource Allocating Request message sent by the UE to a PGW.

In step 404, the PGW creates a Dedicated Bearer Request, and sends the Dedicated Bearer Request to the SGW; in this step, the PGW determines whether to initiate bearer modification or to establish a new bearer according to information in the Resource Allocating Request message; if the PGW determines to establish a new bearer, step 405 is performed.

In step 405, the SGW forwards the Dedicated Bearer Request created by the PGW to the MME.

In step 406, after receiving the Dedicated Bearer Request message, the MME sends a Bearer Setup Request to the RAN node.

After receiving the Dedicated Bearer Request message, the MME extracts the related identifier of the corresponding UE from the Dedicated Bearer Request message, and obtains the ability information in the mobility management information of the corresponding UE according to the identifier. The MME determines whether the UE has an ability to access a UTRAN or GERAN according to the ability information of the UE; if the MME finds out that the UE has the ability to access the UTRAN or GERAN, in the Bearer Setup Request message, the MME assigns a value of a TI to each bearer established by the UE, in which the TI information may be carried as an independent IE or a part of a Session Management Configuration IE.

It should be noted that, before determining the ability information of the UE, the MME may firstly assign a bearer identifier according to the created Dedicated Bearer Request message sent by the PGW, and may also obtain the bearer identifier related to the UE at the same time. When the UE has the ability to access the UTRAN or GERAN, the MME generates the TI according to all the determined bearer identifiers and a preset generation rule. Here, the specific generation rule is not limited, but each TI needs to be corresponding to each bearer identifier.

In step 407, a radio bearer is established; in this step, the RAN node transparently transmits the TI information to the UE through the establishment of the radio bearer. The UE receives and stores the value of the TI, and uses the value of the TI when accessing the UTRAN and the GERAN.

In step 408, the RAN creates Bearer Setup Response.

In step 409, the MME creates Create Bearer Response.

In step 410, the SGW forwards the Create Bearer Response created by the MME.

Steps 408 to 410 may be summarized as follows: The RAN node returns a Bearer Setup Response to the MME, and the MME creates a Create Bearer Response message to the PGW.

In this embodiment, during the resource requesting process, the MME may assign the TI to the UE, enabling the UE to obtain the TI, so that the UE can still perform normal processing after moving to the GERAN/UTRAN.

A4. PDN Connection Request Process Initiated by a UE

Figure 5:
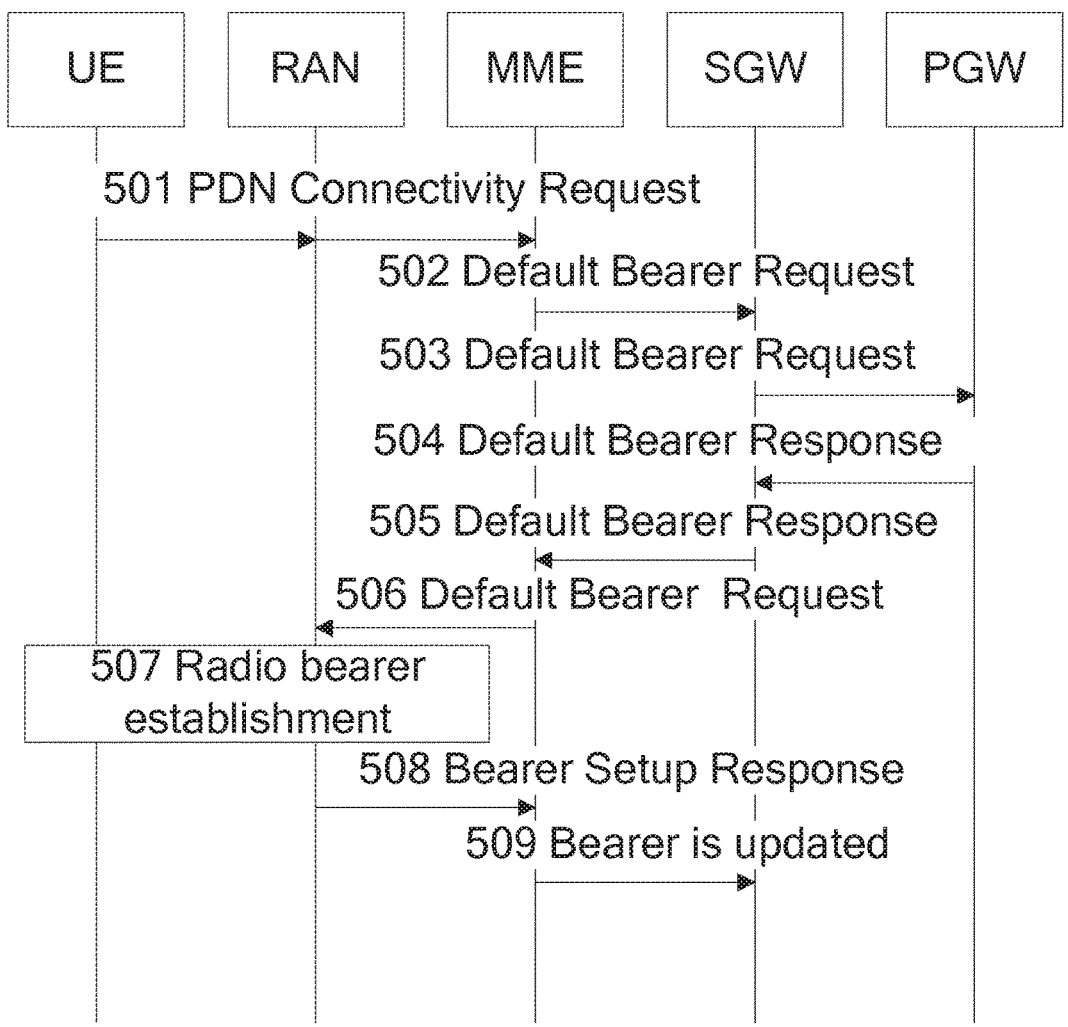
FIG. 5 is a flow chart of a fourth embodiment of a data communication method according to the present invention.

In a fourth embodiment, as shown in FIG. 5, a flow chart of requesting the PDN connection by the UE is described.

In step 501, the UE establishes a PDN Connectivity Request, and sends the PDN Connectivity Request to an RAN.

In step 502, the RAN forwards the PDN Connectivity Request established by the UE to an MME.

In step 503, the MME creates a Default Bearer Request and sends the Default Bearer Request to an SGW.

In step 504, the SGW forwards the Default Bearer Request created by the MME to a PGW.

In step 505, the PGW creates a Default Bearer Response to the SGW.

Steps 501 to 505 may be summarized as follows: The UE sends a PDN Connectivity Request message to the MME, the MME initiates a default bearer establishing procedure to the PGW after selecting the PGW and the SGW, and the PGW responds and creates a Default Bearer Response message and sends it to the MME.

In step 506, the SGW forwards the Default Bearer Response created by the PGW to the MME.

In the step, after receiving the created Default Bearer Request message, the MME sends a Bearer Setup Request to an RAN node.

After receiving the PDN Connectivity Request message, the MME obtains ability information of the UE from mobility management information of the corresponding UE, and determines whether the UE has an ability to access a UTRAN or GERAN according to the ability information of the UE. If the MME finds out that the UE has the ability to access the UTRAN or GERAN, in the bearer Setup Request message, the MME assigns a value of a TI to each bearer established by the UE, in which the TI information may be carried as an independent IE or a part of a Session Management Configuration IE.

It should be noted that, before determining the ability information of the UE, the MME may firstly assign a bearer identifier according to the created Default Bearer Request message sent by the PGW, and may also obtain the bearer identifier related to the UE. When the UE has the ability to access the UTRAN or GERAN, the MME generates the TI according to all the determined bearer identifiers and a preset generation rule. Here, the specific generation rule is not limited, but each TI needs to be corresponding to each bearer identifier.

In step 507, a radio bearer is established; in the step, the RAN node transparently transmits the TI information to the UE through the establishment of the radio bearer. The UE receives and stores the value of the TI, and uses the value of the TI when accessing the UTRAN and the GERAN.

In step 508, the RAN creates a Bearer Setup Response.

In step 509, the MME updates the bearer to the SGW.

Steps 508 to 509 may be summarized as follows: The RAN node returns a Bearer Setup Response to the MME, and the MME updates the bearer to the SGW.

In this embodiment, during the PDN connection requesting process, the MME may assign the TI to the UE, enabling the UE to obtain the TI, so that the UE can still perform normal processing after moving to the GERAN/UTRAN.

B. TI Generated by a Core Network Element and a UE Together

It is described in the above four embodiments that the MME generates the TI, and sends the generated TI to the UE for storage. It should be understood that in actual applications, after generating the TI, the core network element (including an MME or an SGSN, the specific mode for generating the TI by the SGSN is described in subsequent embodiments) may not directly send the generated TI to the UE, but send a bearer identifier obtained by the core network element to the UE, and instruct the UE to generate the TI according to the bearer identifier or enable the UE to make determination and generate the TI. The specific procedure is described in the following.

In a fifth embodiment, the process for generating the TI by the UE and the core network element includes the following steps.

In step b1, the core network element receives a request message, and obtains ability information of the UE.

In step b2, a bearer identifier is obtained according to the request message.

In step b3, it is determined whether the UE has an ability to access a UTRAN or GERAN according to the ability information of the UE; if the UE has an ability to access a UTRAN or GERAN, the TI is generated according to the bearer identifier and a preset generation rule.

In step b4, the bearer identifier is sent to the UE, and the UE is instructed to generate the TI according to the bearer identifier and the preset generation rule, or the UE generates the TI according to the bearer identifier and the preset generation rule.

It should be noted that, the sequence of executing step b3 and step b4 is not limited, and the two steps may be executed at the same time. In addition, the core network element may also send the generation rule to the UE.

If the core network element does not send the generation rule, after obtaining the bearer identifier, the UE may generate the TI according to the preset generation rule thereof (here the generation rule needs to be consistent with the generation rule in the core network element, and may be determined through negotiation in advance), and the specific mode is not limited here.

If the core network element sends the generation rule, after obtaining the bearer identifier and the generation rule, the UE may generate the TI according to the bearer identifier and the generation rule, and the specific mode is not limited here.

In this embodiment, the UE and the core network element (e.g. an MME or an SGSN) may generate the TI, enabling the UE to obtain the TI, so that the UE can still perform normal processing after moving to the GERAN/UTRAN.

In the embodiment, the UE and the SGSN/MME may generate the TI when necessary. For example, when the UE moves to the UTRAN/GERAN or needs to initiate a session management process in the UTRAN/GERAN, the UE generates the TI, and during handover to the UTRAN/GERAN or an RAU process, the MME generates the TI when transferring the context, and transfers the TI to the SGSN as a part of the context.

C. TI Generated by an SGSN

In this embodiment, during the RAU process from an EUTRAN to a UTRAN or GERAN, after an SGSN obtains the context of a UE from an MME, if the SGSN finds out that a corresponding PDP context does not include TI information, the SGSN assigns a TI to each PDP context, and notifies the UE through an RAU accept message. The specific mode for establishing the TI under the scenario is described in the following.

Figure 6:
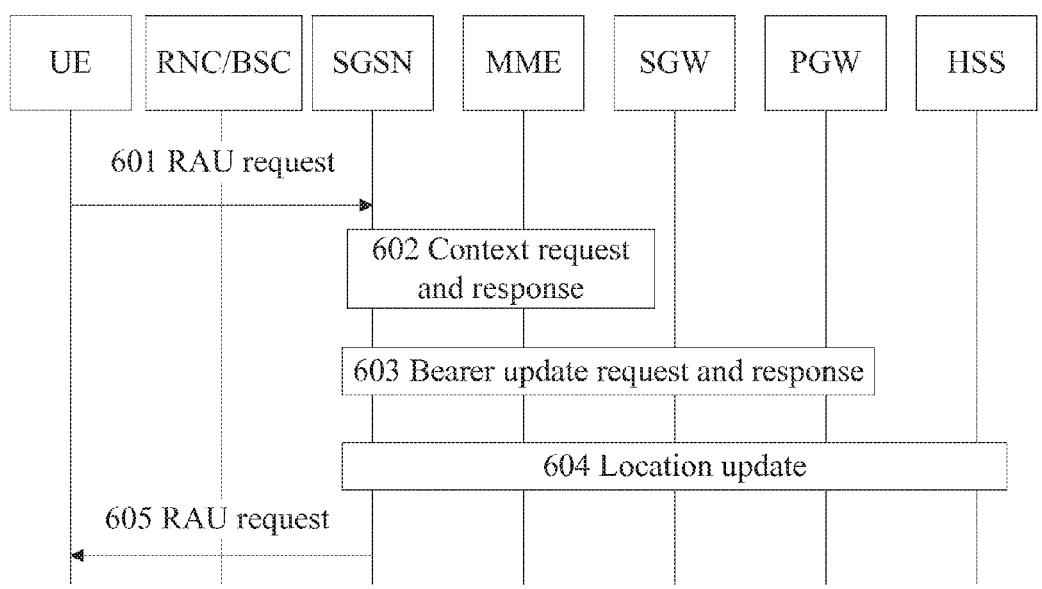
FIG. 6 is a flow chart of a sixth embodiment of a data communication method according to the present invention.

In a sixth embodiment, as shown in FIG. 6, an RAU process from an EUTRAN to a GERAN/UTRAN is described.

In step 601, when moving from the EUTRAN to the GERAN/UTRAN to execute an RAU, a UE send an RAU request message to an SGSN.

In step 602, context request, context response, and acknowledgement are performed between an SGSN and an MME.

Specifically, the SGSN sends a context request message to the MME, so as to request the MME to return context information related to the UE to the SGSN.

After receiving the context request message, the MME returns the corresponding context information to the SGSN.

In step 603, after obtaining the bearer context information from the MME, the SGSN initiates updating the bearer to an SGW and a PGW.

It should be noted that if the SGSN does not find the TI information from the context information returned by the MME, the SGSN assigns a TI to each PDP context.

In step 604, the SGSN initiates location update to a home subscriber server (HSS).

In step 605, the SGSN returns an RAU accept message to the UE, in which the assigned TI is carried.

The situation that the SGSN assigns the TI is described in the sixth embodiment. In actual applications, the context information of the UE needs to be transmitted between the SGSN and the MME. Therefore, it is understood that in a seventh embodiment of the data communication method of the present invention, the TI may also be assigned by the MME.

After receiving the context request message sent by the SGSN, the MME queries the context corresponding to the UE, and determines whether the context includes the TI; if the context does not include the TI, the MME assigns the TI to each bearer context, and returns the bearer context including the assigned TI to the SGSN. Then, the SGSN sends the bearer context to the UE.

It should be noted that in the seventh embodiment of the present invention, the MME obtains the bearer context, and the SGSN obtains the PDP context, but the contexts are essentially the same.

In the first embodiment to the seventh embodiment of the present invention, the corresponding TI is generated in the UE and the SGSN through the same mechanism; or during the handover or the RAU process, the SGSN notifies the UE of the TI corresponding to each PDP context through explicit messages; or the MME generates the TI and notifies the UE through the NAS message, so that the UE uses the TI when accessing the 2G/3G. Therefore, when the bearer established in the LTE is mapped to the PDP context of the 2G/3G, the TI exists in the UE and the SGSN, thereby preventing the problem in the prior art.

It should be noted that in the prior art, when the UE accesses an SAE through the EUTRAN, the default bearer exists, and the default bearer cannot be deleted, and if the default bearer is deleted, the dedicated bearer corresponding to the default bearer will be deleted as well; when the UE accesses the SAE through the GERAN/UTRAN, the default bearer also exists, after being attached to the GERAN/UTRAN, the UE having an EUTRAN ability activates an interactive or background PDP context. However, when a UE of legacy (Pre-R8, the network before the 3GPP R8 version) accesses an R8 (the 3GPP R8 version) network, the UE of Pre-R8 does not know the concept of the default bearer, thereby problems for the subsequent operations are caused. For example, after accessing the network, the UE of Pre-R8 firstly activates the dedicated bearer (a GBR bearer), thereby causing problems for the operation of the SGSN/SGW/PGW. The UE of Pre-R8 initiates deactivation of the main PDP context, and as the main PDP context (default bearer) cannot be deleted, problems for the operation of the SGSN/SGW/PGW will be generated as well.

Therefore, embodiment of the present invention provides a data communication method to solve the problems. In this embodiment, the PDP context establishment and the PDP context deactivation are respectively described.

A. PDP Context Establishment

In this embodiment, the process may be divided into the following types according to different processing modes.

Figure 7:
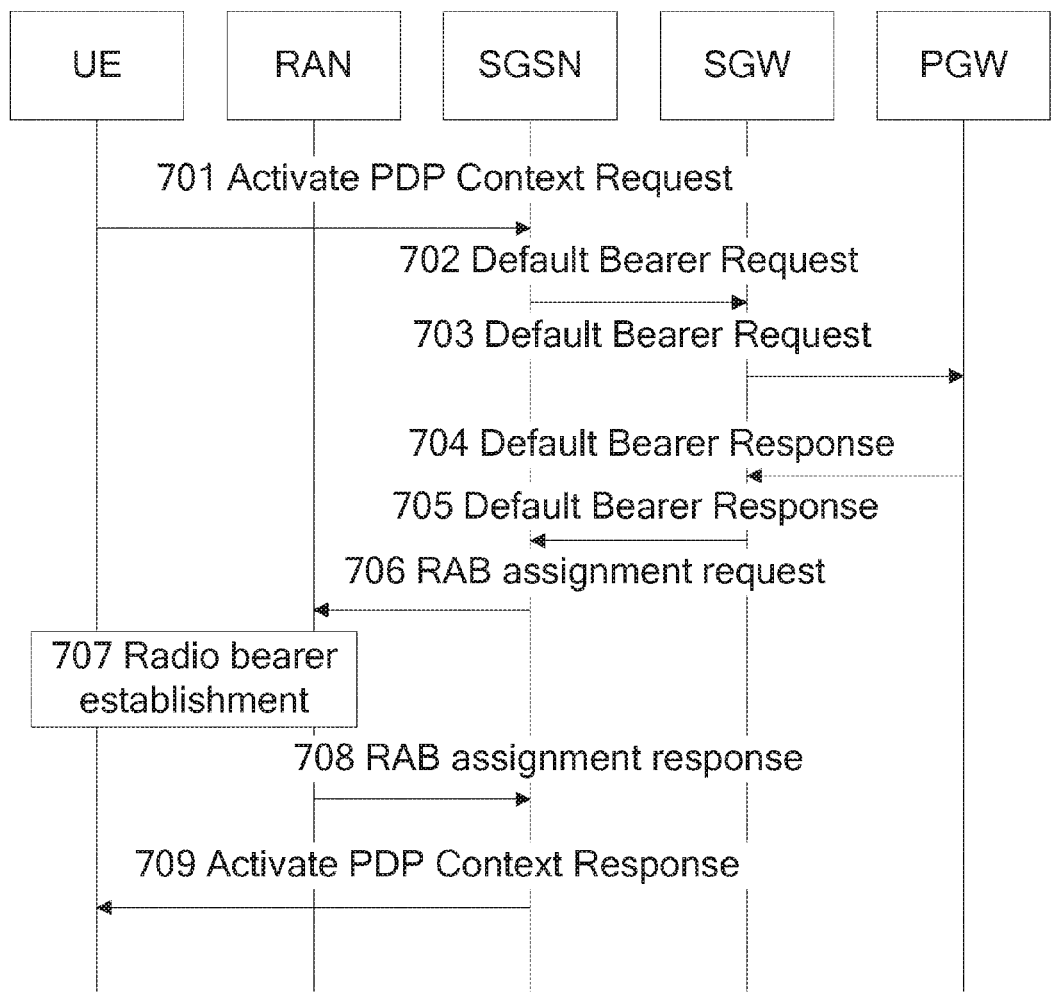
FIG. 7 is a flow chart of an eighth embodiment of a data communication method according to the present invention.

A1. An SGSN performs the processing; specifically, in an eighth embodiment, as shown in FIG. 7, a PDP context establishing process initiated by a UE is described.

In step 701, the UE sends an Activate PDP Context Request message to the SGSN.

In this embodiment, the Activate PDP Context Request message carries a QoS parameter for activating a PDP context.

In step 702, if the SGSN determines that the UE is a UE of Pre-R8 according to ability information in mobility management information of the UE, the SGSN converts the QoS parameter.

The specific conversion mode may be as follows: If the QoS parameter is GBR information, the SGSN may change the QoS parameter to non-GBR information for creating a default bearer.

In step 703, the SGW forwards the default bearer request created by the SGSN to the PGW.

In step 704, the PGW creates a default bearer response and sends the default bearer response to the SGW.

In step 705, the SGW forwards the default bearer response created by the PGW to the SGSN.

Steps 703 to 705 may be summarized as follows: The default bearer is established from the SGSN to the SGW and from the SGW to the PGW, and the QoS parameter is modified default bearer information.

In step 706, after receiving the created default bearer response message, the SGSN performs RAB assignment.

In step 707, a radio bearer is established.

In step 708, an RAB assignment response is created.

In step 709, the SGSN returns an Activate PDP Context Response message to the UE, in which the Activate PDP Context Response message includes the QoS parameter of the modified default bearer.

A2. A PGW Performs Processing.

Difference between a ninth embodiment and the eighth embodiment lie in that: An SGSN does not need to change a QoS parameter of GBR to a QoS parameter of a default bearer, that is, the SGSN needs not to convert the QoS parameter, but carries a special instruction in a default bearer creating message sent to an SGW, so as to instruct the SGW that the UE is an UE of Pre-R8, and the SGW initiates default bearer establishment to the PGW instead of rejection according to the special instruction. Similarly, the default bearer creating request message from the SGW to the PGW also carries the special instruction, the PGW accepts the QoS provided by the UE according to the instruction, or the PGW modifies the QoS parameter to the QoS parameter of the default bearer, that is, the PGW converts the QoS parameter, and then the PGW establishes the default bearer according to the QoS parameter. The special instruction may be an instruction indicating that the UE is the UE of Pre-R8 or other similar instructions.

In the ninth embodiment of the present invention, the PGW converts the QoS parameter, and establishes the default bearer according to the converted parameter, or does not convert the QoS parameter, but directly establishes the default bearer according to the received parameter.

In the eighth embodiment and the ninth embodiment of the present invention, during the PDP context activation initiated by the UE, the SGSN may convert the QoS information of the non-default bearer reported by the UE to the information of the default bearer for creating the default bearer, and at this time, the SGSN does not need to give the special instruction to the SGW and the PGW. During the PDP context activation initiated by the UE, the SGSN gives the special instruction to the SGW/PGW. The PGW accepts the QoS provided by the UE according to the instruction, or the PGW modifies the QoS information to the QoS information of the default bearer, and gives a response to the SGSN and UE. Therefore, when the UE of Pre-R8 accesses the R8 network, the problems in the subsequent operations of the SGSN/SGW/PGW caused by the UE of Pre-R8 not knowing some characteristics of the R8 network (for example the default bearer) are solved. Specifically, for example, the UE of Pre-R8 does not know the concept of the "default bearer" in the R8 network, so that when the UE requests to establish the bearer, the UE does not instruct to request to establish the default bearer. Therefore, the UE of Pre-R8 in the prior art cannot establish the default bearer in the R8 network, so that the SGSN/SGW/PGW cannot perform the processing about the default bearer subsequently.

In this embodiment, when the SGSN determines that the UE is a UE of Pre-R8, the SGSN converts the QoS parameter, so as to instruct the PGW to establish the default bearer, or the SGSN adds an attribute instruction for instructing the PGW to establish the default bearer. Therefore, in this embodiment, the UE of Pre-R8 may normally establish the default bearer in the R8 network, so that the SGSN/SGW/PGW may perform the corresponding processing according to the default bearer.

B. PDP Context Deletion

In this embodiment, the process may be divided into the following types according to different processing modes.

B1. An SGSN Performs the Processing.

In a tenth embodiment, a PDP context deactivation process initiated by a UE is described.

Firstly, the UE initiates a Deactivate PDP Context Request message to the SGSN.

In this embodiment, the Deactivate PDP Context Request message carries a PDP context identifier requested to be deleted.

Next, the SGSN determines whether the UE is a UE of Pre-R8 according to ability information of the UE; if the UE is a UE of Pre-R8, the SGSN determines whether the PDP context is a default bearer according to the PDP context identifier requested to be deleted, and if the PDP context is a default bearer, the SGSN returns a Deactivate PDP Context Reject message to the UE to reject a deleting operation of the UE.

It should be understood that, in actual applications, the SGSN may not directly reject the deleting operation.

Figure 8:
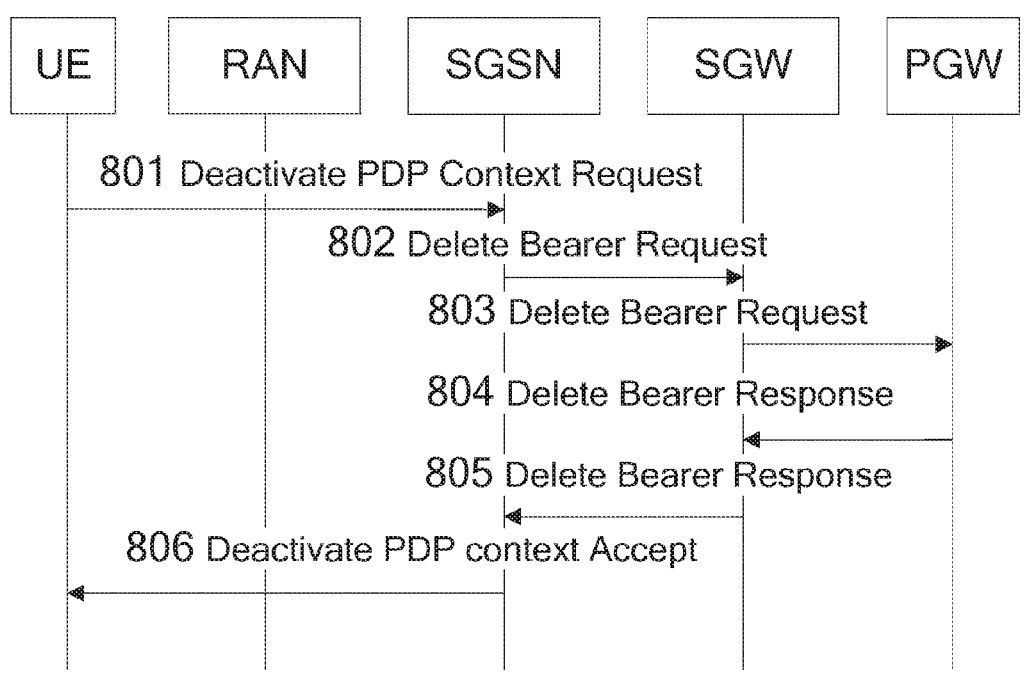
FIG. 8 is a flow chart of a tenth embodiment of a data communication method according to the present invention.

In an eleventh embodiment, as shown in FIG. 8, the process includes the following steps.

In step 801, a UE initiates a Deactivate PDP Context Request to an SGSN.

In this embodiment, the Deactivate PDP Context Request message carries a PDP context identifier requested to be deleted.

In step 802, the SGSN sends a Delete Bearer Request message.

If the SGSN determines that the UE is a UE of Pre-R8 according to ability information of the UE, the SGSN initiates a Delete Bearer Request, and carries the PDP context identifier requested to be deleted and a special instruction which may be an instruction indicating that the UE is a UE of Pre-R8 or other similar instructions.

In step 803, the SGW sends a Delete Bearer Request message to the PGW in which the PDP context identifier requested to be deleted and the special instruction are carried as well according to the trigger of the SGSN.

In step 804, according to the special instruction, if it is requested to delete the default bearer, the PGW accepts the Delete Bearer Request and reserves dedicated bearers, and creates a Delete Bearer Response.

In step 805, the SGW forwards the Delete Bearer Response.

In step 806, the SGSN sends a Deactivate PDP context Response to the UE.

It should be noted that, in this embodiment, after receiving the Delete Bearer Request message sent by the SGW, if the PGW knows that the UE is the UE of Pre-R8 according to the special instruction, the PGW determines whether the bearer context is the default bearer according to the bearer context identifier requested to be deleted, and if the bearer context is the default bearer, the PGW deletes the default bearer, and reserves other dedicated bearers related to the default bearer.

In the above embodiment, during the bearer deleting process, the SGSN may also initiate the bearer deleting request and carry the bearer context identifier requested to be deleted and the special instruction. According to the trigger of the SGSN, the SGW sends the Delete Bearer Request message to the PGW, in which the PDP context identifier requested to be deleted and the special instruction are carried. According to the special instruction, if it is requested to delete the default bearer, the PGW accepts the deletion request and reserves the dedicated bearer related to the default bearer. Therefore, when the UE of Pre-R8 accesses the R8 network, the problems in the subsequent operations of the SGSN/SGW/PGW caused by the UE of Pre-R8 not knowing some characteristics of the R8 network (for example, the default bearer) are solved. Specifically, for example, in the R8 network, if the UE of R8 requests to delete the default bearer, that is, the UE of R8 requests to delete all the other dedicated bearers related to the default bearer at the same time, after the deletion, the UE may be separated from the R8 network. Therefore, normally, the UE of R8 does not request to delete the default bearer, but requests to delete the dedicated bearer, but the UE of Pre-R8 does not know the concept of the "default bearer" in the R8 network. Therefore, when requesting to delete the bearer, the UE may request to delete the default bearer by mistake, and in the prior art, and the default bearer and other related bearers may be directly deleted, so that the UE may be separated from the R8 network, which may be not the true intention of the UE.

In this embodiment, when the bearer requested by the UE of Pre-R8 to be deleted is the default bearer, the SGSN directly rejects the deleting request, so that the default bearer is not deleted, or the SGSN adds an attribute instruction, so as to instruct the PGW to delete only the default bearer and reserve other dedicated bearers related to the default bearer when the UE requests to delete the default bearer. Thus, the problem that the UE of Pre-R8 is separated from the R8 network after the default bearer is deleted is prevented.

Embodiments of a communication system according to the present invention are described in the following. According to different application scenarios, the communication system according to the embodiments of the present invention may be approximately categorized as follows.

(1) A first embodiment of the communication system according to the present invention is corresponding to the third embodiment of the method, and specifically includes a PGW and an MME.

The PGW is configured to receive a Resource Allocation Request message sent by the MME, determine whether to initiate bearer modification or establish a new bearer according to the Resource Allocation Request message, and send a Dedicated Bearer Request message to the MME if determining to establish the new bearer.

The MME is configured to receive the Resource Allocation Request message sent by a UE, forward the Resource Allocation Request message to the PGW, receive the Dedicated Bearer Request message sent by the PGW, obtain a bearer identifier according to the Dedicated Bearer Request message, obtain ability information of the UE, determine whether the UE has an ability to access a UTRAN or GERAN according to the ability information of the UE, generate a TI according to the bearer identifier and according to a preset generation rule if the UE has the ability, and send the TI to the UE.

In this embodiment, the MME may assign the TI to the UE, enabling the UE may obtain the TI, so that the UE can still perform normal processing after moving to the GERAN/UTRAN.

(2) A second embodiment of the communication system according to the present invention is corresponding to the fifth embodiment of the method, and specifically includes a core network element and a UE.

The core network element is configured to receive a request message, obtain ability information of the UE, obtain a bearer identifier according to the request message, determine whether the UE has an ability to access a UTRAN or GERAN according to the ability information of the UE, generate a TI according to the bearer identifier and a preset generation rule if the UE has the ability, and send the bearer identifier to the UE.

The UE is configured to receive the bearer identifier sent by the core network element, and generate the TI according to the preset generation rule.

The core network element may be an MME or an SGSN.

In this embodiment, the core network element and the UE generate the corresponding TI together, enabling the UE to obtain the TI, so that the UE can still perform normal processing after moving to the GERAN/UTRAN.

(3) A third embodiment of the communication system according to the present invention is corresponding to the eighth embodiment of the method, and specifically includes an SGSN and a PGW.

The SGSN is configured to receive an Activate PDP Bearer Context Request message sent by a UE, determine whether the UE is a UE having Pre-R8 attribute according to ability information of the UE in the Activate PDP Bearer Context Request message, and if the UE is a UE having Pre-R8 attribute, convert a QoS parameter in the Activate PDP Bearer Context Request message and send the converted QoS parameter to the PGW.

The PGW is configured to receive the converted QoS parameter sent by the SGSN, and create a default bearer according to the converted QoS parameter.

In this embodiment, the PGW may create the default bearer according to the converted QoS parameter, so that the UE of Pre-R8 may normally create the default bearer.

(4) A fourth embodiment of the communication system according to the present invention is corresponding to the ninth embodiment of the method, and specifically includes an SGSN and a PGW.

The SGSN is configured to receive an Activate PDP Bearer Context Request message sent by a UE, determine whether the UE is a UE having Pre-R8 attribute according to ability information of the UE in the Activate PDP Bearer Context Request message, and send a Default Bearer Request message including attribute instruction information and a QoS parameter to the PGW if the UE is a UE having Pre-R8 attribute.

The PGW is configured to receive the Default Bearer Request message sent by the SGSN, convert the QoS parameter according to the attribute instruction information, create a default bearer according to the converted QoS parameter, or directly create the default bearer according to the QoS parameter sent by the SGSN.

In this embodiment, the PGW may convert the QoS parameter, and create the default bearer according to the converted QoS parameter, so that the UE of Pre-R8 may normally create the default bearer.

It should be noted that, the PGW may also not convert the QoS parameter, but directly create the default bearer according to the QoS parameter sent by the SGSN.

(5) A fifth embodiment of the communication system according to the present invention is corresponding to the eleventh embodiment of the method, and specifically includes an SGSN and a PGW.

The SGSN is configured to receive a Deactivate Bearer Context Request message sent by a UE, determine whether the UE is a UE having a Pre-R8 attribute according to ability information of the UE in the Deactivate Bearer Context Request message, and send a Deactivate Bearer Context Request message including attribute instruction information and a PDP context identifier to the PGW if the UE is a UE having a Pre-R8 attribute.

The PGW is configured to receive the Deactivate Bearer Context Request message sent by the SGSN, determine whether the PDP context identifier is a default bearer according to the attribute instruction information, and delete the default bearer and reserve a dedicated bearer related to the default bearer if the PDP context identifier is a default bearer.

In this embodiment, the PGW may delete the default bearer according to an instruction of the SGSN, and reserve the dedicated bearer related to the default bearer, so that the UE of Pre-R8 may normally create the default bearer.

Related devices according to the embodiments of the present invention are described in the following.

Figure 9:
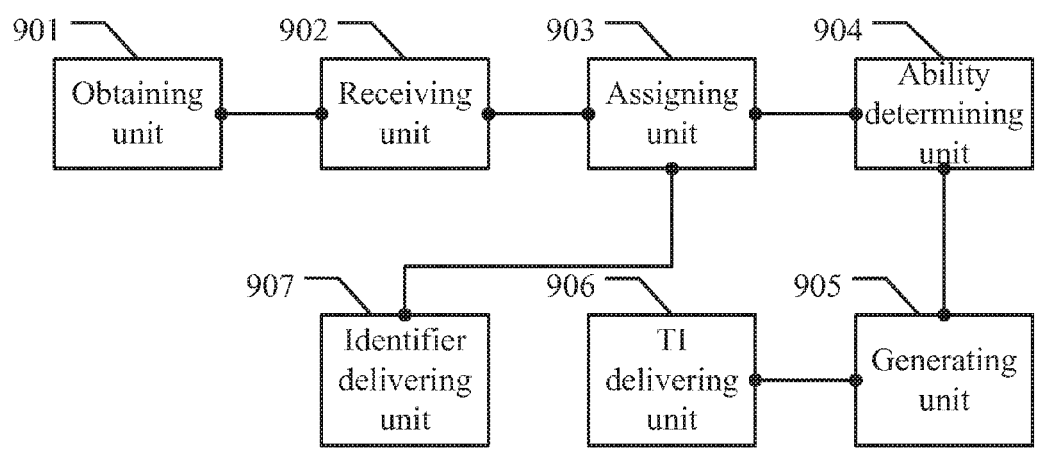
FIG. 9 is a structural view of an embodiment of an MME according to the present invention.

Referring to FIG. 9, an MME according to the embodiment of the present invention includes an obtaining unit 901, a receiving unit 902, an assigning unit 903, an ability determining unit 904, and a generating unit 905.

The obtaining unit 901 is configured to obtain ability information of a UE.

The receiving unit 902 is configured to receive a request message.

The assigning unit 903 is configured to obtain a bearer identifier according to the request message.

The ability determining unit 904 is configured to determine whether the UE has an ability to access a UTRAN or GERAN according to the ability information of the UE, and send a determination result to the generating unit.

The generating unit 905 is configured to generate a TI according to the bearer identifier and a preset generation rule when the determination result is that the UE has an ability to access a UTRAN or GERAN.

In this embodiment, the MME may further include a TI delivering unit 906.

The TI delivering unit 906 is configured to send the TI to the UE.

In this embodiment, the MME may further include an identifier delivering unit 907.

The identifier delivering unit 907 is configured to send the bearer identifier to the UE to instruct the UE to generate the TI according to the bearer identifier and the preset generation rule.

Figure 10:
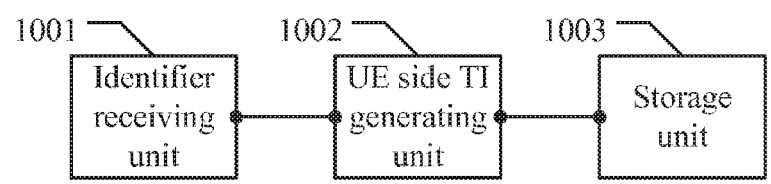
FIG. 10 is a structural view of an embodiment of a UE according to the present invention.

Referring to FIG. 10, a UE according to the embodiment of the present invention includes an identifier receiving unit 1001, a UE side TI generating unit 1002, and a storage unit 1003.

The identifier receiving unit 1001 is configured to receive a bearer identifier delivered by a core network element.

The UE side TI generating unit 1002 is configured to generate a TI according to the bearer identifier and a preset generation rule.

The storage unit 1003 is configured to store the preset generation rule and the generated TI.

Figure 11:
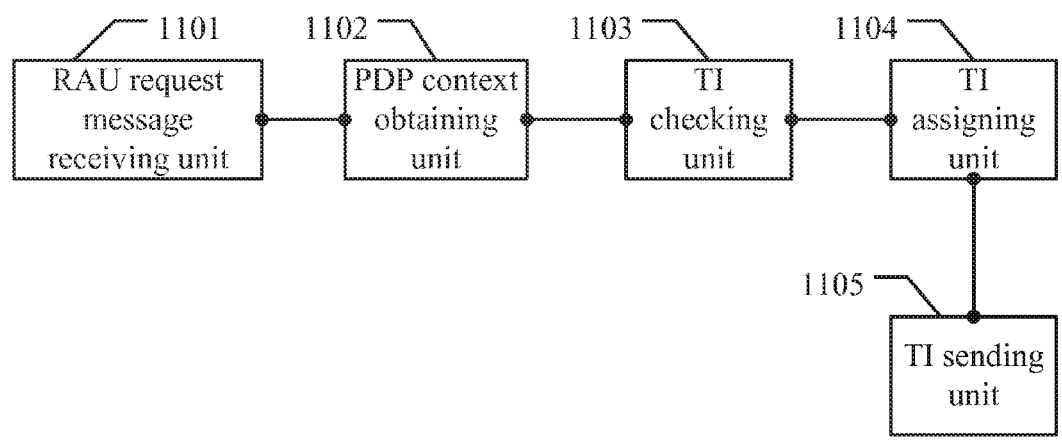
FIG. 11 is a structural view of an embodiment of a core network element according to the present invention.

Referring to FIG. 11, a core network element according to the embodiment of the present invention includes an RAU request message receiving unit 1101, a PDP context obtaining unit 1102, a TI checking unit 1103, a TI assigning unit 1104, and a TI sending unit 1105.

The RAU request message receiving unit 1101 is configured to receive an RAU request message sent by a UE.

The PDP context obtaining unit 1102 is configured to obtain a corresponding PDP context according to the RAU request message.

The TI checking unit 1103 is configured to determine whether the PDP context includes a TI, and send a determination result to the TI assigning unit 1104.

The TI assigning unit 1104 is configured to assign the TI to the PDP context according to the RAU request message when the TI checking unit 1103 determines that the PDP context does not include a TI.

The TI sending unit 1105 is configured to send the TI to the UE.

Figure 12:
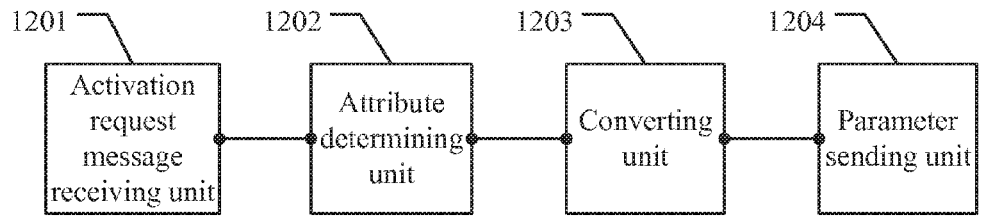
FIG. 12 is a structural view of a first embodiment of an SGSN according to the present invention.

Referring to FIG. 12, a first embodiment of an SGSN according to the present invention includes an activation request message receiving unit 1201, an attribute determining unit 1202, a converting unit 1203, and a parameter sending unit 1204.

The activation request message receiving unit 1201 is configured to receive an Activate PDP Context Request message sent by a UE.

The attribute determining unit 1202 is configured to determine whether the UE is a UE having a Pre-R8 attribute according to ability information of the UE in the Activate PDP Context Request message.

The converting unit 1203 is configured to convert a QoS parameter in the Activate PDP Context Request message when the UE is the UE having the Pre-R8 attribute.

The parameter sending unit 1204 is configured to send the converted QoS parameter to a PGW.

Figure 13:
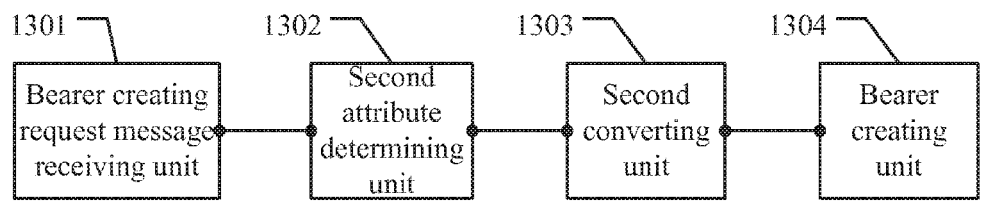
FIG. 13 is a structural view of a first embodiment of a PGW according to the present invention.

Referring to FIG. 13, a first embodiment of a PGW according to the present invention includes a bearer creating request message receiving unit 1301, a second attribute determining unit 1302, a second converting unit 1303, and a bearer creating unit 1304.

The bearer creating request message receiving unit 1301 is configured to receive a Default Bearer Request message sent by an SGSN.

The second attribute determining unit 1302 is configured to determine whether the Default Bearer Request message includes attribute instruction information.

The second converting unit 1303 is configured to convert a QoS parameter in the Default Bearer Request message when the Default Bearer Request message includes the attribute instruction information.

The bearer creating unit 1304 is configured to create a default bearer according to the converted QoS parameter.

It should be noted that the second converting unit 1303 in this embodiment is optional, that is, the QoS parameter may not be converted, and at this time, the bearer creating unit 1304 may directly create the default bearer according to the QoS parameter sent by the SGSN.

Figure 14:
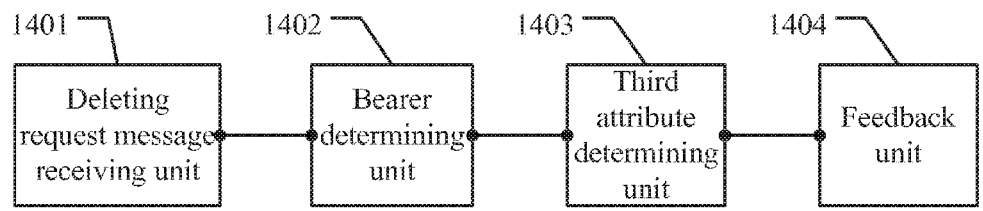
FIG. 14 is a structural view of a second embodiment of an SGSN according to the present invention.

Referring to FIG. 14, a second embodiment of the SGSN according to the present invention includes a deleting request message receiving unit 1401, a bearer determining unit 1402, a third attribute determining unit 1403, and a feedback unit 1404.

The deleting request message receiving unit 1401 is configured to receive a Deactivate PDP Context Request message sent by a UE.

The bearer determining unit 1402 is configured to determine whether a PDP context identifier in the Deactivate PDP Context Request message is a default bearer.

The third attribute determining unit 1403 is configured to determine whether the UE is a UE having a Pre-R8 attribute according to ability information of the UE in the Deactivate PDP Context Request message when the PDP context identifier is the default bearer.

The feedback unit 1404 is configured to return a Deactivate PDP Context Reject message to the UE when the UE is the UE having the Pre-R8 attribute.

Figure 15:
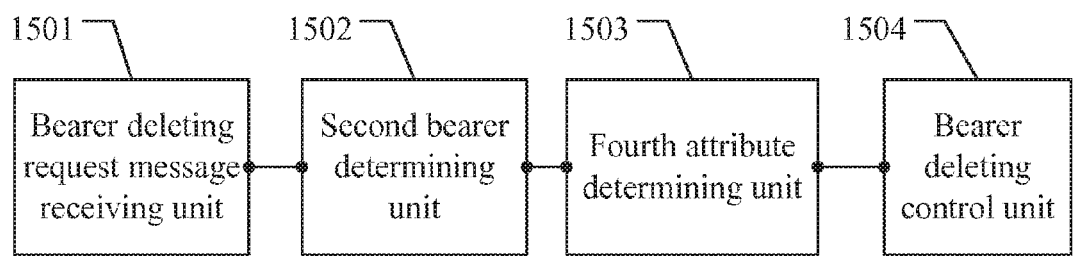
FIG. 15 is a structural view of a second embodiment of a PGW according to the present invention.

Referring to FIG. 15, a second embodiment of the PGW according to the present invention includes a bearer deleting request message receiving unit 1501, a second bearer determining unit 1502, a fourth attribute determining unit 1503, and a bearer deleting control unit 1504.

The bearer deleting request message receiving unit 1501 is configured to receive a Delete Bearer Request message sent by an SGSN.

The second bearer determining unit 1502 is configured to determine whether a PDP context identifier in the Delete Bearer Request message is a default bearer.

The fourth attribute determining unit 1503 is configured to determine whether the Delete Bearer Request message includes attribute instruction information when the PDP context identifier is the default bearer.

The bearer deleting control unit 1504 is configured to delete the default bearer and reserve a dedicated bearer related to the default bearer when the Delete Bearer Request message includes the attribute instruction information.

Skilled person in the art should understand that all or a part of the steps in the method according to the embodiments of the present invention can be implemented by a program instructing relevant hardware, and the program may be stored in a computer readable storage media. When the program is run, the following steps are performed.

A request message is received, and ability information of a UE is obtained.

A bearer identifier is obtained according to the request message.

It is determined whether the UE has an ability to access a UTRAN or GERAN according to the ability information of the UE, and if the UE has an ability to access a UTRAN or GERAN, a TI is generated according to the bearer identifier and a preset generation rule.

The storage media may be a ROM, a magnetic disk, or an optical disk.

The data communication method, the communication system, and the related devices of the present invention are described in detail above. The principle and implementation of the present invention are described herein through specific examples. The description about the embodiments of the present invention is merely provided for ease of understanding of the method and core ideas of the present invention. Persons of ordinary skill in the art can make variations and modifications to the present invention in terms of the specific implementations and application scopes according to the ideas of the present invention. Therefore, the specification shall not be construed as limitations to the present invention.

What is claimed is:

1. A communication system comprising:
a mobility management entity (MME) configured to:
receive a request message from a user equipment (UE), wherein the request message comprises ability information of the UE;
generate a transaction identifier (TI) associated with a default bearer of the UE if the ability information of the UE indicates that the UE has an ability to access a Universal Terrestrial Radio Access Network(UTRAN) or a GSM/EDGE Radio Access Network (GERAN); and
transmit the generated TI to the UE for interworking from Evolved Universal Terrestrial Radio Access Network (E-UTRAN) to the UTRAN or GERAN.

2. The communication system of claim 1, wherein the request message comprises an attach request message.

3. The communication system of claim 2, wherein the MME is configured to transmit session management information to a base station, wherein the session management information comprises the generated TI.

4. The communication system of claim 2, wherein the MME is configured to transmit an attach accept message to a base station, and wherein the attach accept message comprises the generated TI.

5. The communication system of claim 3, wherein the MME is configured to transmit an attach accept message to a base station, and wherein the attach accept message comprises the session management information.

6. The communication system of claim 1, wherein the request message comprises a packet data network connectivity request message.

7. The communication system of claim 1, wherein the MME is configured to transmit session management information to a base station, and wherein the session management information comprises the generated TI.

8. The communication system of claim 7, wherein the MME is configured to transmit an attach accept message to a base station, and wherein the attach accept message comprises the session management information.

9. The communication system of claim 1, wherein the MME is configured to transmit an attach accept message to a base station, and wherein the attach accept message comprises the generated TI.

10. The communication system of claim 1, further comprising a random access network (RAN) node, the RAN configured to receive the TI from the MME and to forward the TI to the UE.

11. The communication system of claim 1, further comprising a serving gateway (SGW) and a packet data network gateway (PGW),
wherein the MME is further configured to create a request for the default bearer of the UE and transmit the request for the default bearer to the SGW,
wherein the SGW is configured to forward the request for the default bearer to the PGW,
wherein the PGW is configured to create a response for the default bearer corresponding to the request for the default bearer and transmit the response for the default bearer to the SGW, and
wherein the SGW is further configured to forward the response for the default bearer to the MME.

12. A communication method comprising:
receiving, by a mobility management entity (MME), a request message from a user equipment (UE), wherein the request message comprises ability information of the UE;
generating, by the MME, a transaction identifier (TI) associated with a default bearer of the UE if the ability information of the UE indicates that the UE has an ability to access a Universal Terrestrial Radio Access Network(UTRAN) or a GSM/EDGE Radio Access Network (GERAN); and
transmitting, by the MME, the generated TI to the UE for interworking from Evolved Universal Terrestrial Radio Access Network (E-UTRAN) to the UTRAN or GERAN.

13. The method of claim 12, wherein the request message comprises an attach request message.

14. The method of claim 12, wherein transmitting the generated TI comprises:
transmitting, by the MME, an attach accept message to a base station, and wherein the attach accept message comprises the generated TI.

15. The method of claim 12, wherein transmitting the generated TI comprises:
transmitting, by the MME, session management information to a base station, wherein the session management information comprises the generated TI.

16. The method of claim 15, wherein transmitting the generated TI comprises:
transmitting, by the MME, an attach accept message to a base station, and wherein the attach accept message comprises the session management information.

17. The method of claim 12, wherein the request message comprises a packet data network connectivity request message.

18. The method of claim 12, further comprising:
receiving, by a random access network (RAN) node, the TI from the MME and forwarding the TI to the UE.

19. The method of claim 12, further comprising:
creating, by the MME, a request for the default bearer of the UE and transmitting the request for the default bearer to a serving gateway (SGW),
forwarding, by the SGW, the request for the default bearer to a packet data network gateway (PGW),
creating, by the PGW, a response for the default bearer corresponding to the request for the default bearer and transmitting the response for the default bearer to the SGW, and forwarding, by the SGW, the response for the default bearer to the MME.

* * * * *